US012776933B2

(12) United States Patent
Tang et al.

(10) Patent No.: US 12,776,933 B2
(45) Date of Patent: Oct. 27, 2026

(54) SELF-CALIBRATING CORRELATING RECEIVERS

(71) Applicant: California Institute of Technology, Pasadena, CA (US)

(72) Inventors: Adrian J. Tang, Pasadena, CA (US); Goutam Chattopadhyay, Pasadena, CA (US); Omkar Pradhan, Pasadena, CA (US); Subash Khanal, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 18/904,924

(22) Filed: Oct. 2, 2024

(65) Prior Publication Data

US 2025/0112807 A1 Apr. 3, 2025

Related U.S. Application Data

(60) Provisional application No. 63/542,018, filed on Oct. 2, 2023.

(51) Int. Cl.
*H04L 27/00* (2006.01)
*H04B 1/10* (2006.01)

(52) U.S. Cl.
CPC ........... *H04L 27/0014* (2013.01); *H04B 1/10* (2013.01); *H04L 2027/0016* (2013.01)

(58) Field of Classification Search
CPC ........ H04L 27/0014; H04L 2027/0016; H04B 1/10
See application file for complete search history.

(56) References Cited

U.S. PATENT DOCUMENTS

| | | | | |
|---|---|---|---|---|
| 11,374,803 | B2 * | 6/2022 | Abdel Fattah | H03G 3/008 |
| 12,452,681 | B2 * | 10/2025 | Montalvo | G06N 3/02 |
| 2023/0318613 | A1 * | 10/2023 | Ke | H04L 27/2647 341/155 |

* cited by examiner

*Primary Examiner* — Dac V Ha
(74) *Attorney, Agent, or Firm* — Gates & Cooper LLP

(57) ABSTRACT

A circuit comprising a first Fourier Transform block operable to perform a Fourier Transform and having a first input configured for receiving an I signal and a second input configured for receiving a Q signal; a first plurality of n of outputs for I channels and Q channels each comprising a different frequency bin output from the Fourier Transform; I and Q summing blocks comprising a set of connector lines connecting an ith one of I channels with an ith one of the Q channels; an inverse Fourier Transform block connected to the summing blocks and operable to perform an inverse Fourier Transform; a correlator for correlating the outputs of the inverse Fourier Transform; a Fourier Transform block for Fourier Transforming the correlator output; a comparator for comparing the correlation term to zero; and an error correction circuit for tuning the magnitude and phase of the I and Q channels using the comparator output as feedback.

20 Claims, 6 Drawing Sheets

SELF-CALIBRATING CORRELATING RECEIVERS

CROSS REFERENCE TO RELATED APPLICATIONS

This application claims the benefit under 35 U.S.C. Section 119 (e) of U.S. Provisional Application No. 63/542,018, filed Oct. 2, 2023, by Adrian J. Tang, Goutam Chattopadhyay, Omkar Pradhan and Subash Khanal, entitled "SELF CALIBRATING CORRELATING RECEIVERS," (CIT-9074), which application is incorporated by reference herein.

STATEMENT REGARDING FEDERALLY SPONSORED RESEARCH AND DEVELOPMENT

This invention was made with Government support under Grant No. 80NMO0018D0004 awarded by NASA (JPL). The Government has certain rights in this invention.

BACKGROUND OF THE INVENTION

1. Field of the Invention

The present disclosure relates to circuits useful in correlating receivers and methods of making and using the same.

2. Description of the Related Art

Correlating receivers are a special type of remote sensing instrument that have the unique capability to both observe and calibrate at the same time. A similar structure is also used in wireless communication systems to allow single-sideband reception (allowing two distinct frequency ranges above and below the local oscillator frequency to be received simultaneously}.

While powerful conceptually, traditional correlating receivers have an issue that the two receiver/downconverter/detector paths in their implementation (called I and Q} need to be extremely well matched for the radiometric calibration to be valid. This becomes a major issue, especially at higher frequencies as it is not possible to achieve the required level of matching for an overall calibration validity at the levels needed for remote sensing.

At a fundamental level, the result of the mismatch is that some of the observation signal is contaminated with leakage from the calibration signal and the calibration signal is contaminated with some leakage of the observation signal. In this state the amount of each signal in each other signal cannot be determined and so a final bound on how accurate the system can be calibrated to is set.

To overcome this, many techniques introduce digital corrections that digitally correct the mismatch between the two paths of the correlating receiver in the baseband. This is accomplished by taking the I and Q path and scaling each by a set of coefficients and adding the two paths to each other with the scaling coefficients applied. This essentially undoes the mismatch problem as the contamination of each channel by the other channel is removed. The major problem is that up to now, no clear path exists for determining the correct coefficients that undo the mismatch. As a result, a slow experimental process with known signals must be conducted to perform this correction. As the receiver slowly drifts in gain and phase, this process must be repeated, taking away valuable observation time.

What is needed are correlation receiver allowing continuous simultaneous calibration and observation. The present invention satisfies this need.

SUMMARY OF THE INVENTION

The present disclosure describes a device useful in a correlating receiver, In one embodiment, the device comprises a circuit comprising an I signal input configured to receive an I signal; a Q signal input configured to receive a Q signal; a first mixer connected to the I signal input operative to mix the I signal with a local oscillator (LO) signal to obtain a down-converted I signal; a second mixer connected to the Q signal input operative to mix the Q signal with the LO signal to obtain a down-converted Q signal; an analog to digital converter connected to the first mixer and the second mixer operative to convert the down-converted I signal into a digital I signal and convert the down-converted Q signal into a digital Q signal; and the circuit further operative to:

(a) Fourier Transform the digital I signal to form a plurality n of I channels each comprising a different frequency bin;

(b) Fourier Transform the digital Q signal to form a plurality n of Q channels each comprising a different Q frequency bin;

(c) for each of the 2≤i≤n channels:

sum or combine the ith one of I channels with a portion of ith one of the Q channels to form one or more summed I outputs;

(d) sum or combine the ith one of Q channels with a portion of ith one of the I channels to form one or more summed I outputs;

(e) inverse Fourier Transform the summed I output to form an inverse FT I output;

(f) inverse Fourier Transform the summed Q output to form an inverse FT Q output;

(g) correlate the inverse FT I output and the inverse FT Q output to form a correlator output;

(h) Fourier Transform the correlator output to form an FT output comprising correlator terms;

(g) for one or more of the 2≤i≤n channels, comparing the ith frequency component of the correlator term to zero;

(h) for one or more of the i channels, iteratively tuning a magnitude and phase of the portion of ith one of the Q channels combined with the ith one of the I channels and/or tuning a magnitude and phase of the portion of ith one of the I channels combined with the ith one of the Q channels using the correlator terms as feedback until the ith frequency component of the correlator term is zero.

The system can determine and set calibration coefficients in a correlation receiver directly without needing any interruption to operation (calibration occurs in the background). In this way, the observation and calibration can be 100% of the time and simultaneous. Applications include wireless communication, all remote sensing spectrometers, radiometers, and certain radars.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

The invention disclosed herein provides a non-obvious and non-intuitive solution to the problem of mismatch of the two receiver/downconverter/detector paths in a correlating receivers (called IQ mismatch). This new and non-obvious architecture also solves the specific problem of sideband separation in correlating receivers or sideband separating receivers.

The new architecture takes a Fast Fourier Transform (FFT transform) (as performed in state-of-the-art approaches) but then also immediately undoes this FFT transform for added calibration purposes. We note that by undoing the FFT transform (called an Inverse Fast Fourier Transform or IFFT transform), we can create a correlation term that indicates exactly when the receiver is perfectly calibrated and all the coefficients are correct without needing to take the receiver offline, or needing to inject known signals, essentially bypassing the correction and calibration processes performed in existing receivers.

In one embodiment, a 3rd level FFT transform is then performed to access the error of calibration on a per FFT channel basis so that corrections can be made to individual parts of the spectrum allowing for even more robust calibration than considering the entire output spectrum as a single power level for error correction.

Figure 1:
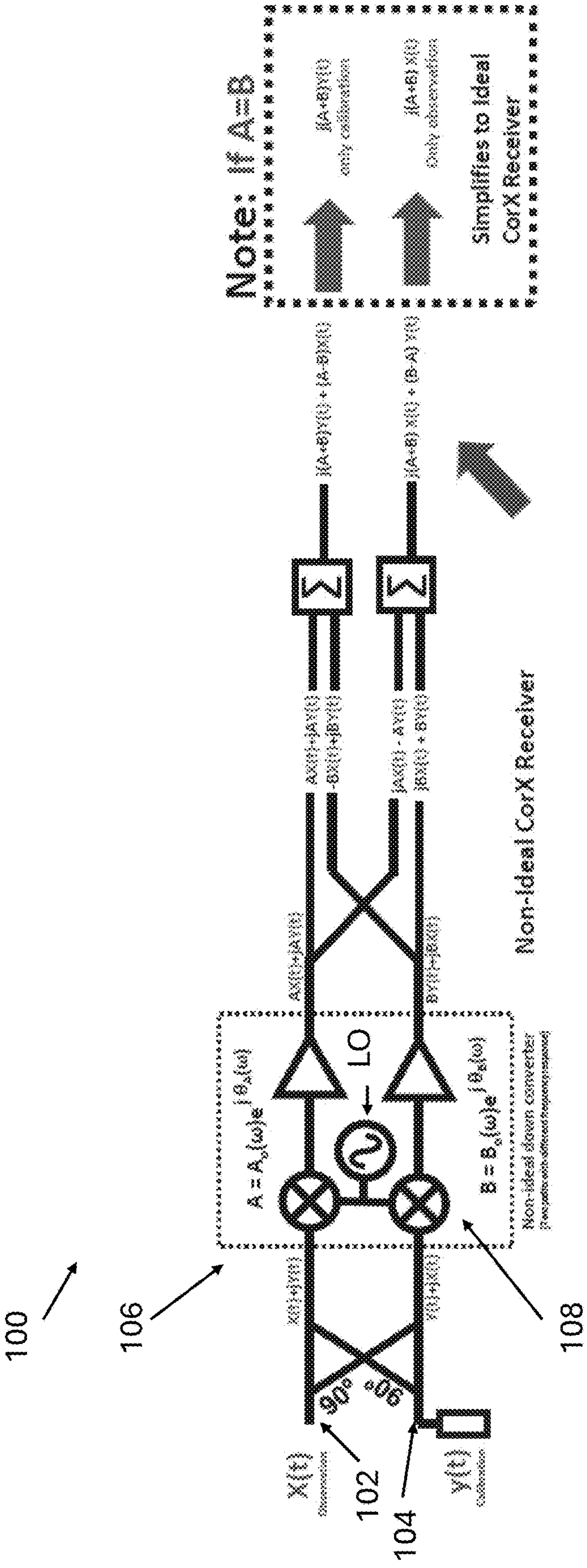
FIG. 1. Front End of a Correlating Receiver.

FIG. 1 illustrates a conventional correlating receiver wherein operation is challenging because the I and Q path must be well matched to avoid limitation of calibration performance caused by cross contamination of the calibration and observation signals with each other.

Figure 2:
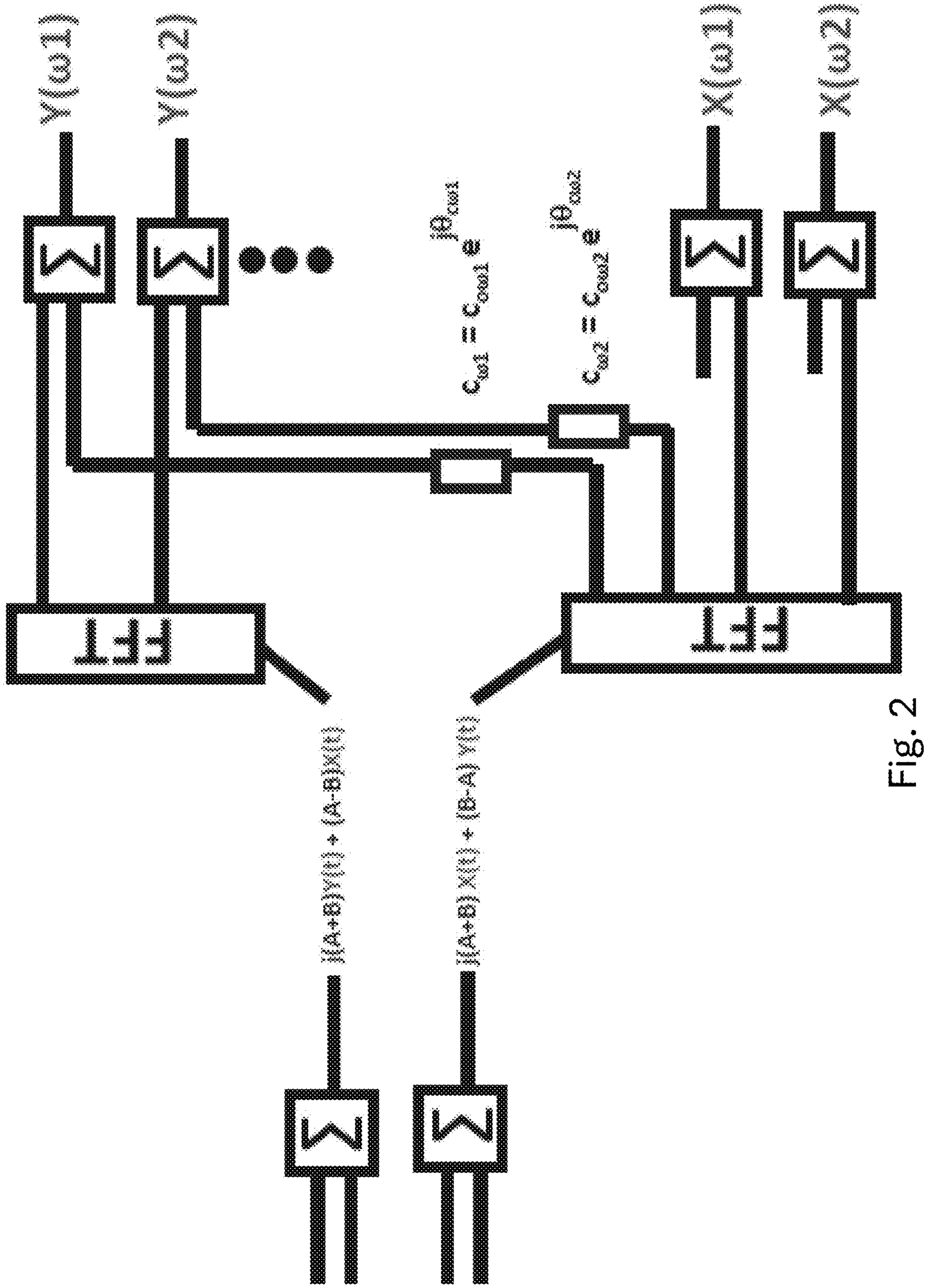
FIG. 2. Conventional calibration in Correlating Receiver.

FIG. 2 illustrates a modern spectrometer architecture computing the FFT of I and Q independently and introducing coefficient scaled super-position on a per channel (FFT bin) basis, to remove the cross-contamination through a secondary calibration process (not radiometric calibration). Determining these coefficients, however, is not straightforward and requires calibration with an input tone or similar, thereby reducing observation time, especially if the I and Q path drift in short time periods. More specifically, conventional techniques introduce coefficients $\{C_{\omega 1}C_{\omega 2}, \ldots, C_{\omega N}\}$ that remove the (A-B) term on a per channel basis after reception and are determined by feeding in a tone and observing suppression on a channel-by-channel basis. The benefit of near 100% observation time is lost if this needs to be performed frequently as A and B drift vs time.

However, it was discovered that if the FFTs are inverted, the correlation of the inverted FFT for each of the I and Q channels goes to zero when A=B:

$$\int (j(A+B)X(t)+(B-A)Y(t))(j(A+B)Y(t)+(A-B)X(t))dt$$

$$\int -(A+B)^2 \text{[illegible]} + \int\left( j(A+B)(A-B)X(t)^2dt + \right.$$

$$\int j(A+B)(B-A)Y(t)^2dt + \int j(B-A)(B-A) \underbrace{\text{[illegible]}}_{\textit{uncorrelated noises}} dt$$

[illegible]

$$\int j(A+B)(A-B)X(t)^2dt + \int j(A+B)(B-A)Y(t)^2dt$$

This expression goes to zero when $A=B$

Thus, the correlation of the inverted FFT can be used as an error signal in a control loop for controlling the coefficients $\{C_{\omega 1}C_{\omega 2}, \ldots, C_{\omega N}\}$. The correct (and selected coefficients) are those for which the correlation of the inverse transform goes to zero.

However, the feedback in the control loop would be weak if tuning Con and only making a correction at frequency on while considering all the power across the entire band 0 to ωN as an error signal $$\frac{\partial \int j(A+B)(A-B)X(t)^2dt + \int j(A+B)(B-A)Y(t)^2dt}{\partial C\omega n},$$

because the percentage change of the whole band power versus the coefficient change at a single frequency is small so the control loop signal to noise ratio (SNR) will be poor.

This problem can be solved by taking the FFT again of the correlating term and only observing the correlation component at on (the channel being tuned) that results from tuning of Cωn (the coefficient for that channel):

Closed Loop Slope = [illegible]

Figure 4:
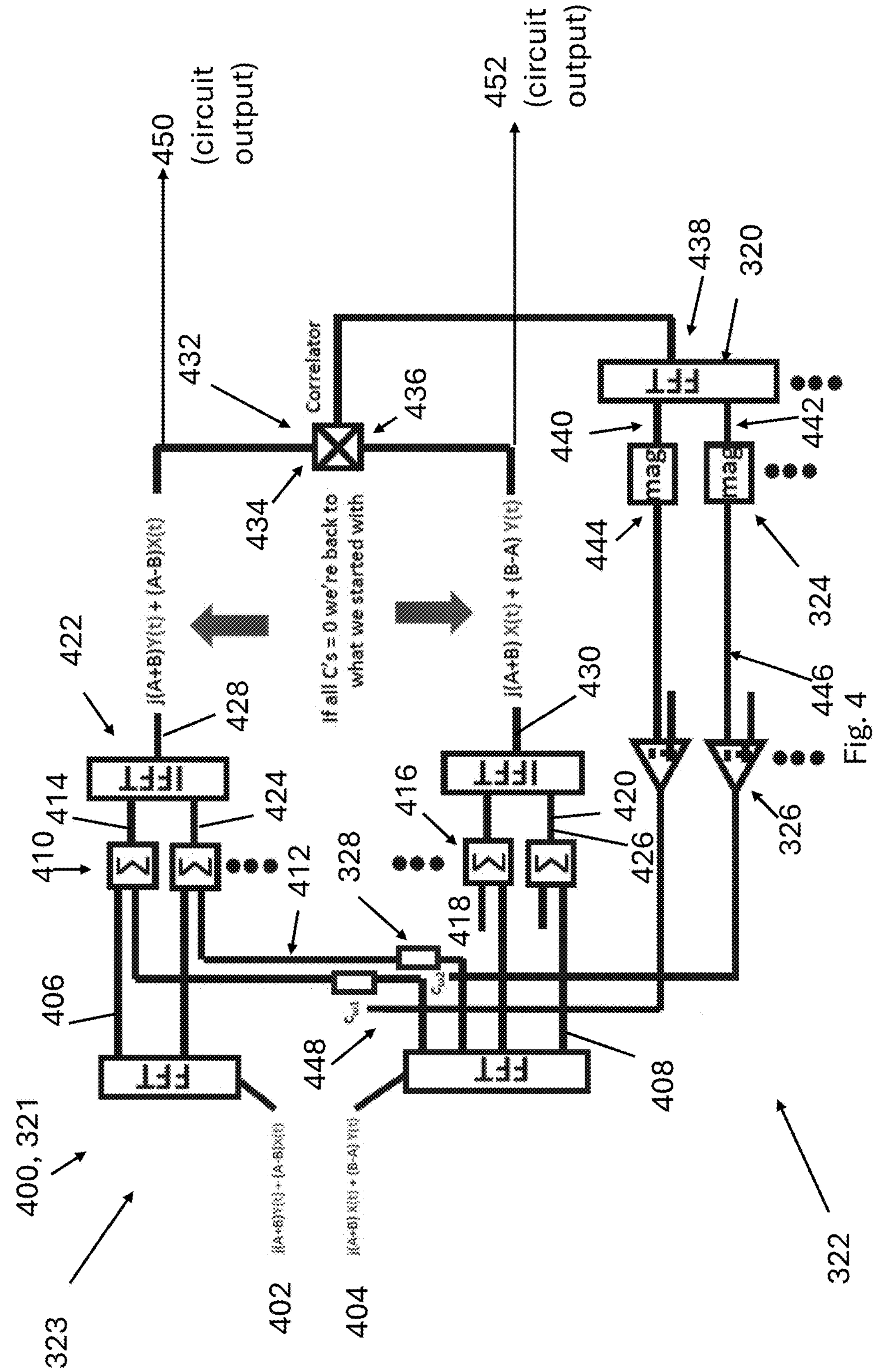
FIG. 4. A circuit for setting calibration coefficients according to one or more embodiments.

FIG. 4 illustrates the system with feedback loop comprising an error amplifier and feedback loop for tuning the coefficients $\{C_{\omega 1}C_{\omega 2}, \ldots, C_{\omega N}\}$. The phase $\theta_{con}$ and amplitude $C_{o\omega n}$ for each channel are tuned sequentially (one channel at a time). Since both amplitude and phase for each channel are tuned, the control needs to be cautious (small steps, long time constants) because a bad phase setting will give a bad estimate when correcting amplitude, and a bad amplitude setting will give a bad estimate of the correct phase. After some convergence time, A will be approximately equal B and the entire system approximates an ideal correlating receiver the no intervention needed for calibration (e.g., I and Q cross-contamination calibration can be performed automatically and while the observation is occurring) provided the following conditions are met: X and Y are uncorrelated, the signal to noise ratio is within a reasonable range allowing for the loops to converge, and changes in A and B are over longer time constants than the loop bandwidth.

Figure 3:
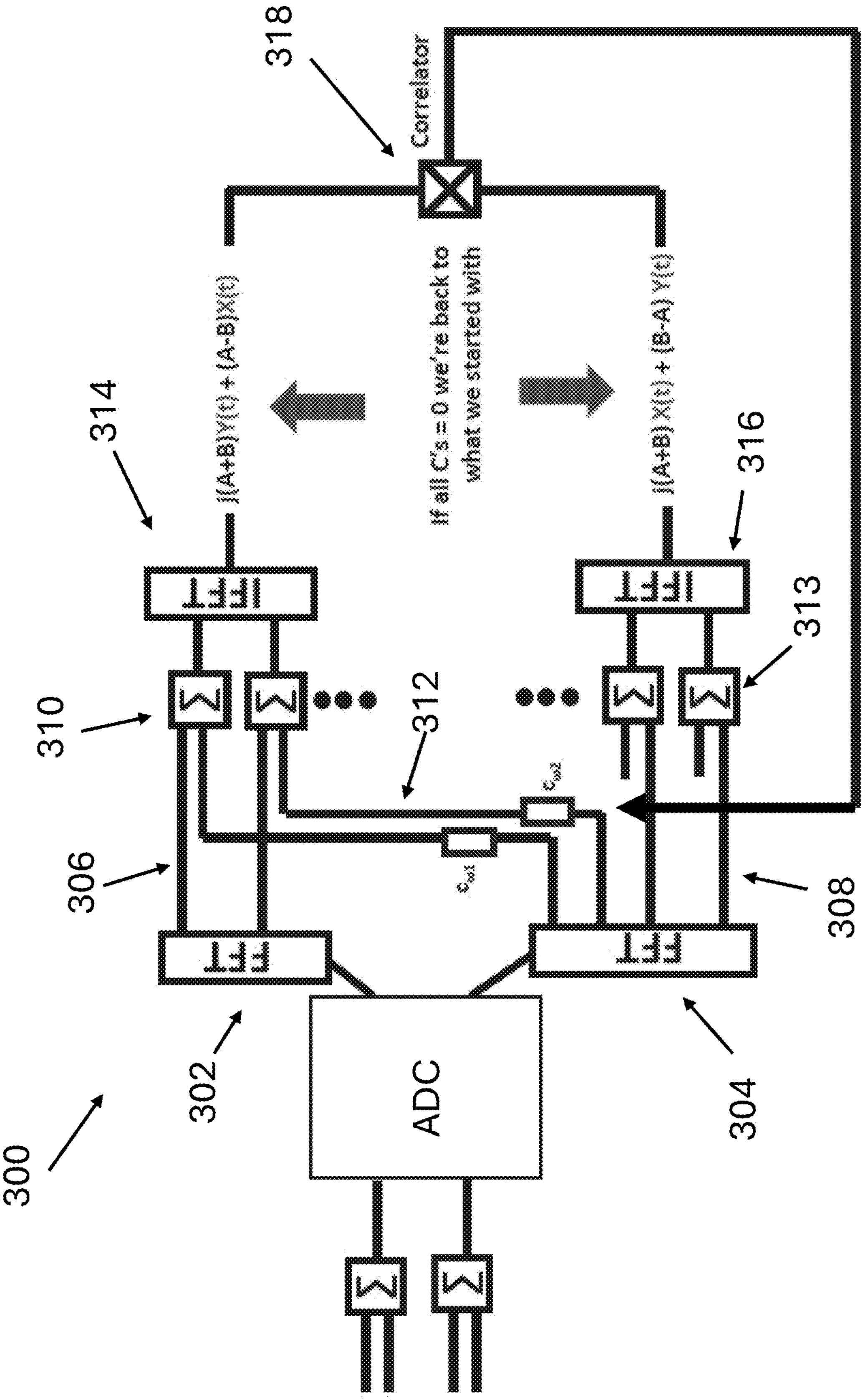
FIG. 3. A circuit for measuring calibration coefficients according to one or more embodiments.

FIGS. 1, 3, and 4 illustrates a circuit useful in or as a correlating receiver, comprising an I signal input 102 for receiving an I signal; a Q signal input 104 for receiving a Q signal; a first mixer 106 for mixing the I signal with a local oscillator (LO) signal to obtain a down-converted I signal; a second mixer 108 for mixing the Q signal with the LO signal to obtain a down-converted Q signal; and an analog to digital converter (ADC) for converting the analog down converted I signal into an I digital signal and the analog downconverted Q signal into a Q digital signal.

FIG. 4 illustrates the circuit is further operative to or configured for:

1. performing, in a Fourier transform block or circuitry 323, 302 a Fourier transform of the digital I signal to form a plurality n of I channels 306 each comprising a different frequency bin; and performing (in the Fourier transform block or circuitry 304) a Fourier Transform of the digital Q signal to form a plurality n of Q channels 308 each comprising a different Q frequency bin;
2. for each of the n channels 306, 308, in a summer or summing block or circuit 310, a summing or combining the ith one of I channels with a portion of ith one of the Q channels to form a summed I output; and summing block 313 for combining the ith one of Q channels with a portion of ith one of the I channels to form a summed Q output;
3. performing (in an inverse Fourier Transform Block or circuitry 422, 314) an Inverse Fourier Transform of the summed I output to form a first inverse FFT at a first inverse FT block output; and performing (in an inverse Fourier Transform Block or circuitry 316) an inverse Fourier Transform of the summed Q output to form a second inverse FFT at a second inverse FT block output;
4. Correlating, in a correlator 318, the first inverse FFT and the second inverse FFT to form a correlator output;
5. performing (in a Fourier Transform block or circuitry 320) a Fourier Transform of the correlator output to form an FFT comprising correlator terms at the FFT output;
6. for one or more if the i channels 306, 308, tuning, in an error correction circuit 322 comprising a feedback loop, a magnitude and phase of the portion of ith one of the Q channels combined with the ith one of the I channels, and the magnitude and phase of the portion of ith one of the I channels combined with the ith one of the Q channels, the correction circuit further comprising a comparator for determining whether the ith frequency component of the correlator term is zero and the feedback iteratively tuning the magnitude and phase of the portion until the ith frequency component of the correlator term is zero.

In one or more embodiments, the two parallel FFTs 302, 304 could be reduced to or implemented in a single structure called a complex FFT.

Process Steps

Figure 5:
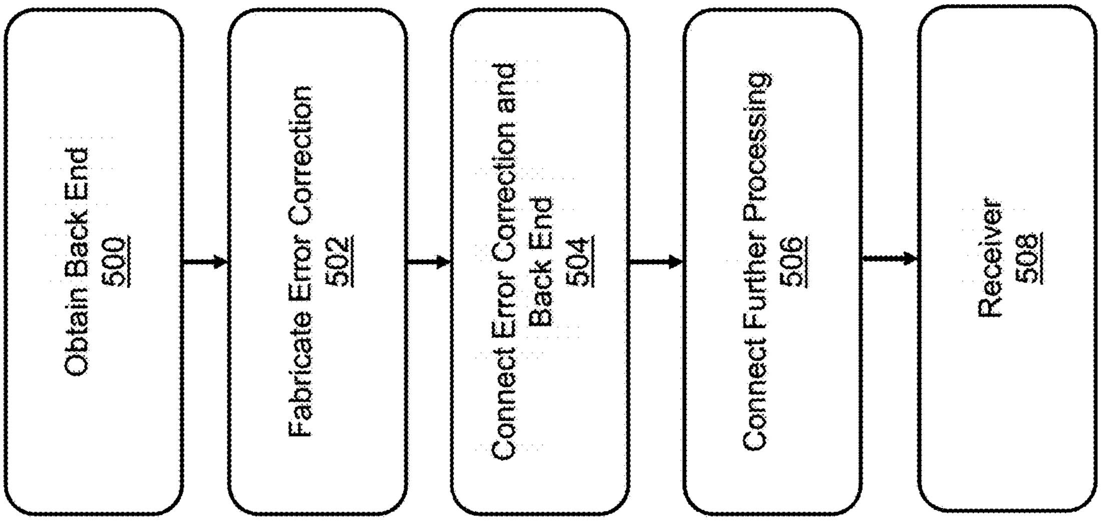
FIG. 5. A method of making a device according to one or more embodiments.

FIG. 5 illustrates a method of making a circuit comprising the following steps.

Block 500 represents optionally obtaining or fabricating a front end for the receiver comprising an I signal input for receiving an I signal; a Q signal input for receiving a Q signal; a first mixer for mixing the I signal with a local oscillator (LO) signal to obtain a down-converted I signal; a second mixer for mixing the Q signal with the LO signal to obtain a down-converted Q signal; and optionally an analog to digital converter for digitizing the down-converted signals.

Block 502 represents obtaining or fabricating a back end, a baseband processor, or error correction or calibration processing circuitry comprising one or more Fourier Transform blocks, a coefficient tuning block, one or more Inverse Fourier Transform blocks, a correlator; one or more comparators; and an error correction feedback loop.

Block 504 represents optionally connecting the front end and the back end in a receiver architecture.

Block 506 represents connecting further processing circuits, e.g., decoder or demodulator.

Block 508 represents the end result, a correlating receiver or a circuit useful in a correlating receiver architecture.

Illustrative embodiments include, but are not limited to the following (referring also to FIGS. 1-6).

1. A device 300, 400, 100 useful in a correlating receiver, comprising:

an I signal input 102 for receiving an I signal;

a Q signal input 104 for receiving a Q signal;

a first mixer 106 for mixing the I signal with a local oscillator (LO) signal to obtain a down-converted I signal;

a second mixer 108 for mixing the Q signal with the LO signal to obtain a down-converted Q signal;

an analog to digital converter (ADC) for converting the down-converted signals to digital signals, one or more Fourier Transform circuits 302, 304 connected to the first mixer and/or the second mixer via the ADC for performing:

a Fourier Transform of the digital signal comprising the down-converted I signal to form a plurality n of I channels 306 each comprising a different frequency bin;

a Fourier Transform of the digital signal comprising the down-converted Q signal to form a plurality n of Q channels 308 each comprising a different Q frequency bin;

a first summing circuit 310 combining the ith one of I channels with a portion 312 of ith one of the Q channels;

a second summing circuit 313 combining the ith one of Q channels with a portion of the ith one of the I channels to form a summed Q output;

one or more Inverse Fourier Transform circuits 314, 316 for performing an Inverse Fourier Transform of the summed I output to form a first inverse FT output; and performing an inverse Fourier Transform of the summed Q output to form a second inverse FT output;

a correlator 318 for correlating the first inverse FT output and the second inverse FFT output to form a correlator output;

a Fourier Transform circuit 320 for performing a Fourier Transform of the correlator output to form an FT output comprising correlator terms;

an error correction circuit 322 comprising a feedback loop for tuning a magnitude and phase of the portion of ith one of the Q channels combined with the ith one of the I channels and/or the magnitude and phase of the portion of ith one of the I channels combined with the ith one of the Q channels, the correction circuit further comprising a comparator 324 for determining whether the ith frequency component of the correlator term is zero and the feedback iteratively tuning the magnitude and phase of the portion until the ith frequency component of the correlator term is zero.

2. A processor or circuit 321, comprising:

one or more Fourier Transform units 323 or blocks or module configured for performing or adapted to or operable to perform:

a Fourier Transform of a down-converted I signal to form a plurality n of I channels 306 each comprising a different frequency bin;

a Fourier Transform of the down-converted Q signal to form a plurality n of Q channels 308 each comprising a different Q frequency bin;

one or more summer units, blocks, or modules 310, 313 for combining the ith one of I channels with a portion of ith one of the Q channels to form a summed I output and for summing or combining the ith one of Q channels with a portion of ith one of the I channels to form a summed Q output;

one or more inverse Fourier Transform units or modules e.g., first inverse Fourier Transform unit 314 for performing an inverse Fourier Transform of the summed I output to form a first inverse FT output and a second Inverse Fourier Transform unit 316 for performing an inverse Fourier Transform of the second summed output to form a second inverse FT output;

a correlator 318 for correlating the first inverse FT output and the second inverse FT output to form a correlator output;

a Fourier Transform unit 320 for performing a Fourier Transform of the correlator output to form an FT output comprising correlator terms;

an error correction circuit 322 comprising a feedback loop for tuning (in one or more of the i channels) a magnitude and phase of the portion of ith one of the Q channels combined with the ith one of the I channels and/or tuning the magnitude and phase of the portion of ith one of the I channels combined with the ith one of the Q channels, the correction circuit further comprising a comparator 324 for determining whether the ith frequency component of the correlator term is zero and the feedback iteratively tuning the magnitude and phase of the portion until the ith frequency component of the correlator term is zero.

3. A device useful in a correlating receiver, comprising:

a circuit 300, 400, 100 comprising:

an I signal input 102 configured to receive an I signal;

a Q signal input 104 configured to receive a Q signal;

a first mixer 106 connected to the I signal input operative to mix the I signal with a local oscillator (LO) signal to obtain a down-converted I signal;

a second mixer 108 connected to the Q signal input operative to mix the Q signal with the LO signal to obtain a down-converted Q signal;

an analog to digital converter ADC connected to the first mixer and the second mixer operative to convert the down-converted I signal into a digital I signal and convert the down-converted Q signal into a digital Q signal; and the circuit further operative to or configured to or configured for performing:

(a) Fourier Transform the digital I signal to form a plurality n of I channels each comprising a different frequency bin;

(b) Fourier Transform the digital Q signal to form a plurality n of Q channels each comprising a different Q frequency bin;

(c) for each of the 2≤i≤n channels (n is an integer):

sum or combine the ith one of I channels with a portion of ith one of the Q channels to form a summed I output; and sum or combine the ith one of Q channels with a portion of ith one of the I channels to form a summed Q output;

(d) inverse Fourier Transform the summed I output to form an inverse FT I output;

(e) inverse Fourier Transform the summed Q output to form an inverse FT Q output;

(f) correlate the inverse FT I output and the inverse FT Q output to form a correlator output;

(g) Fourier Transform the correlator output to form an FT output comprising correlator terms;

(g) for one or more of the 2≤i≤n channels 306, 308, comparing the ith frequency component of the correlator terms to zero;

(h) for one or more of the 2≤i≤n channels 306, 308, iteratively tuning a magnitude and phase of the portion of ith one of the Q channels combined with the ith one of the I channels and/or tuning the magnitude and phase of the portion of ith one of the I channels combined with the ith one of the Q channels, using the correlator terms as feedback until the ith frequency component of the correlator term is zero.

4. The device of clause 3, wherein iteratively tuning comprises repeating steps (a)-(h) until all the correlator terms for each of the I and/or Q channels is zero.

5. A circuit, comprising:

a first Fourier Transform block, circuit, structure, or processor 400 operable to or configured to perform a Fourier Transform and having:

a first input 402 configured for receiving an I signal and a second input 404 configured for receiving a Q signal;

a first plurality of n of outputs 406 for I channels each comprising a different frequency bin output from the Fourier Transform of the I signal;

a second plurality n of outputs 408 for Q channels each comprising a different Q frequency bin output from the Fourier Transform of the Q signal;

I summing blocks 410 having inputs connected to a comprising a set of connector lines 412 connecting/combining/summing an ith one of I channels with an ith one of the Q channels and an I output 414 for the summed I channel;

Q summing blocks 416 comprising inputs 418 for combining/connecting/summing an ith one of Q channels with an ith one of the I channels and a Q output 420 for the summed Q channel;

an inverse Fourier Transform block 422 connected to the summing blocks 410, 416 and operable to perform an inverse Fourier Transform and having:

first IFT inputs 424 configured for receiving the summed I channels and second IFT 426 inputs configured for receiving the summed Q channels;

a first IFT output 428 for the inverse Fourier Transform of the summed I channels; and as second IFT output 430 for the inverse Fourier Transform of the summed Q channels;

a correlator 432 having a first correlator input 434 connected to the first IFT output; a second correlator input 436 connected to the second IFT output; and a correlator output 438;

a Fourier Transform block 320 having a FT input 438 connected to the correlator output and FT outputs 440;

one or more comparators 324 having comparator inputs 442 connected to the FT outputs and comparator outputs 444;

an error correction circuit 322 comprising feedback inputs 446 connected to the comparator outputs and feedback outputs 448 connected to the outputs of for the I and Q channels 406, 408 from the Fourier transform block 323.

6. The device of clause 3, wherein the circuit comprises:
one or more Fourier Transform blocks 323 or circuits or processors performing the Fourier Transform in steps (a) an (b);
one or more summer or summing circuits 410, 416 performing the summing in steps (c) and (d);
one or more inverse Fourier Transform blocks 422 or circuits or processors performing the inverse Fourier Transform in steps (e) an (f);
a comparator 324 performing the comparing step (g); and
an error correction circuit 322 with a feedback loop performing the step (h).
7. The device of any of the clauses 1-6, wherein the circuit comprises a complex Fast Fourier Transform block or circuit or structure performing the Fourier Transform (e.g., steps (a) and (b) for the I and Q signals).
8. The device of any of the clauses 1-7, wherein the Fourier Transform comprises a discrete Fourier Transform performing a Fast Fourier Transform and/or the inverse Fourier transform comprises a discrete inverse Fourier Transform performing an in inverse fast Fourier transform or inverse discrete fourier transform.
9. The device of any of the clauses 1-8, wherein the circuit further comprises one or more Discrete Fourier Transform processors, circuits or blocks performing the Fourier Transforms and the Inverse Fourier Transform.
10. A remote sensing system, a spectrometer, a wireless communication system, or a radar comprising the device of any of the clauses 1-9.
11. The system of clause 10, wherein on of the I signal or the Q signal is an observation signal and the other of the signals is a calibration signal.
12. A single side band receiver comprising the device of any of the clauses 1-11, wherein one of the I signal or the Q signal has a frequency above the local oscillator frequency and the other of the signals has a frequency below the local oscillator frequency.
13. A system for receiving or a correlating receiver comprising the device of any of the clauses 1-13.
14. The system for receiving or the correlating receiver of clause 13 further comprising a decoder or demodulator operable to decode or demodulate a message or information from at least one of the inverse FT I output 450 and the inverse FT Q output 452, e.g., in a radar, spectroscopy, or communications application.
15. The device of any of the clauses 1-14, wherein the circuit comprises a comparator comprising a magnitude comparator or digital comparator performing the comparing and an error correction circuit comprising an amplifier 326 in series with a resistor 328 for tuning the magnitude and the phase in each of the I channels.
16. The device of any of the clauses 1-15 wherein the I and Q signals inputted to the mixers are signals that are uncorrelated and 90 degrees out of phase.
17. The device of any of the clauses 1-16 wherein the error correction circuit has a bandwidth such that the iteration with feedback can be performed in a time period shorter than drifts in A and B.
18. The device of any of the clauses 1-17, wherein the I input and the Q input to the mixers comprise antennas.
19. The device of any of the clauses 1-18 wherein the circuit comprises an integrated circuit such as an application specific integrated circuit (ASIC) or a field programmable gate array.

Method of Operating

Figure 6:
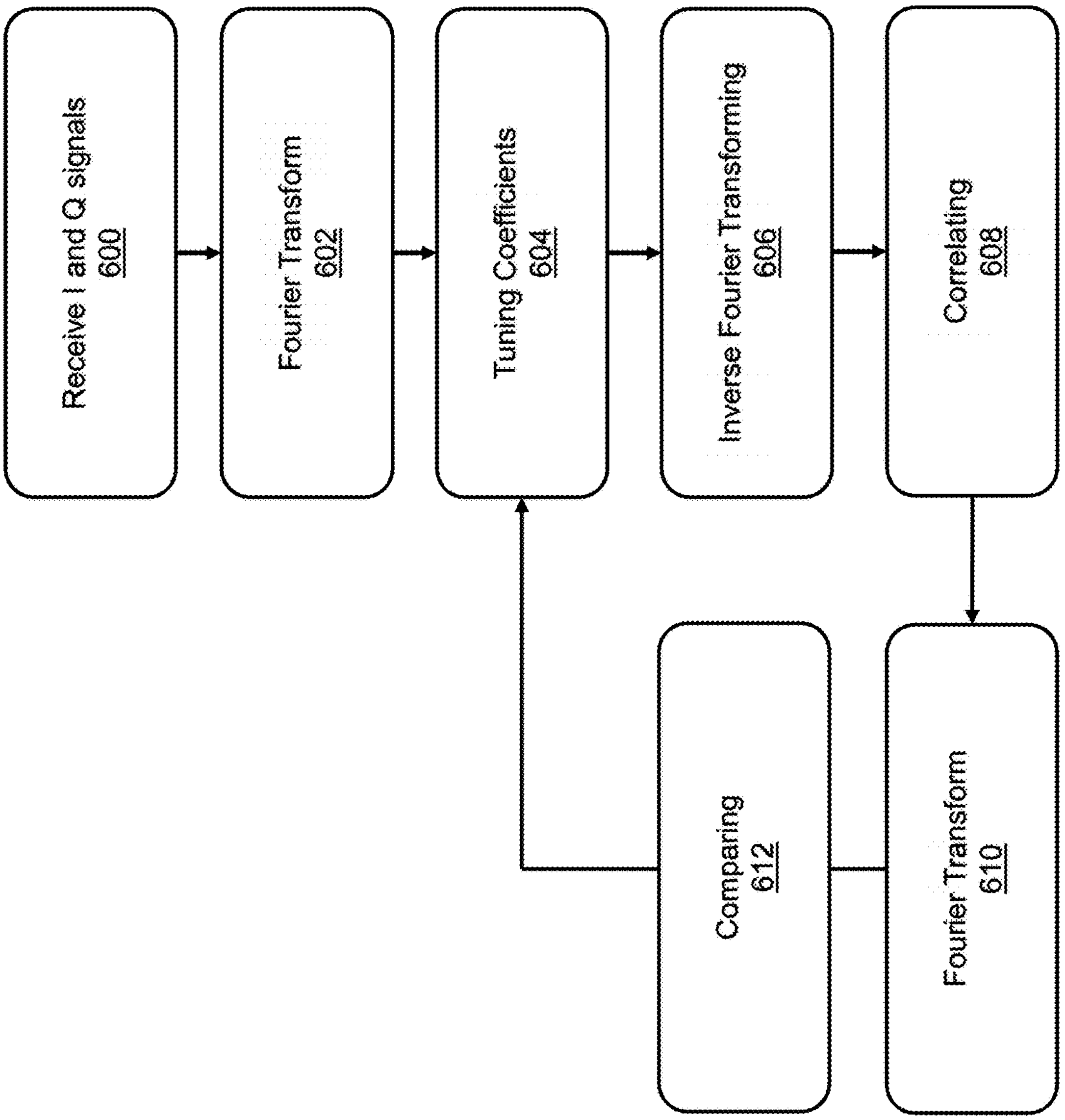
FIG. 6. A method for operating a device according to one or more embodiments.

FIG. 6 illustrates a method for receiving, comprising, in a correlating receiver, the following steps.

Block 600 represents receiving I and Q signals and appropriate processing (mixing to down-convert, and conversion to digital signals).

Block 602 represents performing a Fourier Transform of a digital I signal to form a plurality n of I channels each comprising a different frequency bin; and performing a Fourier Transform of a digital Q signal to form a plurality n of Q channels each comprising a different Q frequency bin.

Block 604 represents tuning the coefficients (magnitude and phase) of the I and Q channels by combining the ith one of I channels with a portion of ith one of the Q channels to form a summed I output and combining the ith one of Q channels with a portion of ith one of the I channels to form a summed Q output;

Block 606 represents performing an inverse Fourier Transform of the summed I output to form an inverse transform I output; performing an inverse Fourier Transform of the summed Q output to form an inverse transform Q output;

Block 608 represents correlating the inverse transform I output and the inverse transform Q output to form a correlator output.

Block 610 represents performing a Fourier Transform of the correlator output to form an FFT output comprising correlator terms;

Block 612 for one or more of the 2≤i≤n channels (n is an integer), comparing the ith frequency component of the correlator term to zero; and iteratively tuning a magnitude and phase of the portion of ith one of the Q channels combined with the ith one of the I channels and tuning the magnitude and phase of the portion of ith one of the I channels combined with the ith one of the Q channels, using feedback comprising the correlator terms, until the ith frequency component of the correlator term is zero.

The method can be performed using the device of any of the embodiments described herein, including those in clauses 1-19 above.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device useful in a correlating receiver, comprising:
a circuit comprising:
an I signal input configured to receive an I signal;
a Q signal input configured to receive a Q signal;
a first mixer connected to the I signal input operative to mix the I signal with a local oscillator (LO) signal to obtain a down-converted I signal;
a second mixer connected to the Q signal input operative to mix the Q signal with the LO signal to obtain a down-converted Q signal;
an analog to digital converter connected to the first mixer and the second mixer operative to convert the down-converted I signal into a digital I signal and convert the down-converted Q signal into a digital Q signal; and
the circuit further operative to:

(a) Fourier Transform (FT) the digital I signal to form a plurality n of I channels each comprising a different frequency bin;

(b) Fourier Transform the digital Q signal to form a plurality n of Q channels each comprising a different Q frequency bin;

(c) for each of the 2≤i≤n channels, where n is an integer: sum or combine the ith one of I channels with a portion of ith one of the Q channels to form a summed I output;

(d) sum or combine the ith one of Q channels with a portion of the ith one of the I channels to form a summed Q output;

(e) inverse Fourier Transform the summed I outputs to form an inverse FT I output;

(f) inverse Fourier Transform the summed Q outputs to form an inverse FT Q output;

(g) correlate the inverse FT I output and the inverse FT Q output to form a correlator output;

(h) Fourier Transform the correlator output to form an FT output comprising correlator terms;

(g) for one or more of the 2≤i≤n channels, comparing an ith frequency component of the correlator term to zero;

(h) iteratively tuning a magnitude and phase of the portion of the ith one of the Q channels combined with the ith one of the I channels and/or iteratively tuning a magnitude and a phase of the portion of the ith one of the I channels combined with the ith one of the Q channels, using the correlator terms as feedback until the ith frequency component of the correlator term is zero.

2. The device of claim 1, wherein the circuit comprises:

one or more Fourier Transform blocks or circuits or processors performing the Fourier Transform in steps (a) an (b);

one or more summer or summing circuits performing the summing in steps (c) and (d);

one or more inverse Fourier Transform blocks or circuits or processors performing the inverse Fourier Transform in steps (e) an (f);

one or more comparators performing the comparing step (g); and an error correction circuit with a feedback loop performing the step (h).

3. The device of claim 1, wherein the circuit comprises a complex Fast Fourier Transform block or circuit or structure performing the steps (a) and (b).

4. The device of claim 1, wherein the Fourier Transform comprises a discrete Fourier Transform performing a Fast Fourier Transform.

5. The device of claim 1, wherein the circuit further comprises one or more Discrete Fourier Transform processors, circuits or blocks performing the Fourier Transforms and the Inverse Fourier Transform.

6. A remote sensing system, a spectrometer, a wireless communication system, or a radar comprising the device of claim 1.

7. The system of claim 6, wherein one of the I signal or the Q signal is an observation signal and the other of the I signal or the Q signal is a calibration signal.

8. A single side band receiver comprising the device of claim 1, wherein one of the I signal or the Q signal has a frequency above the frequency of the local oscillator signal and the other of the I signal or the Q signal has a frequency below the frequency of the local oscillator signal.

9. A system for receiving or a correlating receiver comprising the device of claim 1.

10. The system for receiving or the correlating receiver of claim 9 further comprising a decoder or demodulator operable to decode or demodulate a message or information from at least one of the inverse FT I output and the inverse FT Q output.

11. The device of claim 1, wherein the circuit comprises a comparator comprising a magnitude comparator or digital comparator performing the comparing and an error correction circuit comprising an amplifier in series with a resistor for tuning the magnitude and the phase in each of the I and Q channels.

12. A circuit, comprising:

a first Fourier Transform block operable to perform a Fourier Transform and having:

a first input configured for receiving an I signal and a second input configured for receiving a Q signal;

a first plurality of n of outputs for I channels each comprising a different frequency bin output from the Fourier Transform of the I signal where n is an integer;

a second plurality n of outputs for Q channels each comprising a different Q frequency bin output from the Fourier Transform of the Q signal;

an I summing block comprising a set of connector lines connecting an ith one of I channels with an ith one of the Q channels, and an I output for the summed I channel;

a Q summing block comprising a set of connector lines connecting an ith one of Q channels with an ith one of the I channels, and a Q output for the summed Q channel;

an inverse Fourier Transform (IFT) block connected to the summing blocks and operable to perform an inverse Fourier Transform and having:

a first IFT input configured for receiving the summed I channels and a second IFT input configured for receiving the summed Q channels;

a first IFT output for the inverse Fourier Transform of the summed I channels; and a second IFT output for the inverse Fourier Transform of the summed Q channels;

a correlator having a first correlator input connected to the first IFT output; a second correlator input connected to the second IFT output; and a correlator output;

a Fourier Transform block having an FT input connected to the correlator output and FT outputs;

a comparator having comparator inputs connected to the FT outputs and comparator outputs; and an error correction circuit comprising feedback inputs connected to the comparator outputs and feedback outputs connected to outputs of the I and Q channels from the first Fourier Transform block.

13. The circuit of claim 12 further comprising a decoder or demodulator connected to the outputs of the inverse Fourier Transform block and operable to decode or demodulate a message or information from the inverse Fourier Transform of the I signal and/or Q signal.

14. The device of claim 12, wherein the error correction circuit comprises an amplifier in series with a resistor for tuning a magnitude and a phase of one or more of the portions of I and/or Q channels outputted from the first Fourier Transform Block.

15. A method for receiving, comprising, in a correlating receiver:

performing a Fourier Transform (FT) of a digital I signal to form a plurality n of I channels each comprising a different frequency bin, where n is an integer;

performing a Fourier Transform (FI) of a digital Q signal to form a plurality n of Q channels each comprising a different Q frequency bin;

for each of the I channels, combining the ith one of I channels with a portion of ith one of the Q channels to form an I summed output;

for each of the Q channels, combining the ith one of Q channels with a portion of the ith one of the I channels to form a Q summed output;

performing an inverse Fourier Transform (IFT) of the summed I outputs to form an inverse transform I output;

performing an inverse Fourier Transform (IFT) of the summed Q outputs to form an inverse transform Q output;

correlating the inverse transform I output and the inverse transform Q output to form a correlator output;

performing a Fourier Transform (FT) of the correlator output to form a FT output comprising correlator terms;

for one or more of the 2≤i≤n channels, comparing an ith frequency component of the correlator terms to zero; and iteratively tuning a magnitude and phase of the portion of the ith one of the Q channels combined with the ith one of the I channels and tuning a magnitude and phase of the portion of the ith one of the I channels combined with the ith one of the Q channels, using feedback comprising the correlator terms and until the ith frequency component of the correlator term is zero.

16. The method of claim 15, further comprising receiving an I signal;

receiving a Q signal;

mixing the I signal with a local oscillator (LO) signal to obtain a down-converted I signal;

mixing the Q signal with the LO signal to obtain a down-converted Q signal;

converting the down-converted I signal to the digital I signal; and converting the down-converted Q signal to the digital Q signal.

17. The method of claim 15, further comprising decoding or demodulating a message or information from at least one of the inverse transform Q output or the inverse transform I output.

18. The method of claim 17, wherein the information is used in a remote sensing application, a spectrometer, a wireless communication system, or a radar system.

19. The method of claim 15, wherein one of the I signal or the Q signal is an observation signal and the other of the I signal or the Q signal is a calibration signal.

20. The method of claim 16, wherein one of the I signal or the Q signal has a frequency above a frequency of the local oscillator signal and the other of the I signal or the Q signal has a frequency below a frequency of the local oscillator signal in a single side band receiver.

* * * * *